(12) United States Patent
Combs

(10) Patent No.: US 6,343,891 B1
(45) Date of Patent: Feb. 5, 2002

(54) CANTILEVERED HELICALLY TWISTED BICYCLE STEM CLAMP

(76) Inventor: Trevor L. Combs, 14813 Spring Meadows Dr., Darnestown, MD (US) 20874

( * ) Notice: Subject to any disclaimer, the term of this patent is extended or adjusted under 35 U.S.C. 154(b) by 0 days.

(21) Appl. No.: 09/177,728

(22) Filed: Oct. 23, 1998

Related U.S. Application Data (63) Continuation-in-part of application No. 60/062,795, filed on Oct. 24, 1997.

(51) Int. Cl.$^7$ .............................. E04G 7/00; F16B 7/00
(52) U.S. Cl. ...................... 403/391; 403/385; 74/551.1
(58) Field of Search .............................. 74/551.4, 551.1; 280/279, 280; 403/385, 388, 389, 391, 396, 398, 400

(56) References Cited

U.S. PATENT DOCUMENTS

| | | | | |
|---|---|---|---|---|
| 671,647 A | | 4/1901 | Field ......................... 74/551.6 |
| 2,014,634 A | * | 9/1935 | Polgov ....................... 403/400 |
| 2,942,898 A | * | 6/1960 | Matthysse ................... 403/388 |
| 3,379,414 A | * | 4/1968 | Thurnauer ................... 403/389 |
| 4,115,966 A | * | 9/1978 | DeLee ......................... 403/385 |
| 4,479,661 A | * | 10/1984 | Weigl ......................... 403/389 |
| 4,784,514 A | * | 11/1988 | Pantev ........................ 403/391 |
| 5,095,770 A | | 3/1992 | Rader, III ................... 74/551.1 |
| 5,167,466 A | * | 12/1992 | Hsieh ......................... 403/385 |
| 5,199,322 A | | 4/1993 | Wu ............................ 74/551.1 |
| 5,241,881 A | | 9/1993 | Chen .......................... 74/551.2 |
| 5,259,690 A | * | 11/1993 | Legge ......................... 403/385 |
| 5,299,467 A | | 4/1994 | Marui ........................ 74/551.1 |
| 5,319,993 A | | 6/1994 | Chiang ....................... 74/551.1 |
| 5,331,865 A | * | 7/1994 | Oskam ........................ 74/551.3 |
| 5,361,647 A | * | 11/1994 | Lai ............................ 74/551.2 |
| 5,373,757 A | | 12/1994 | Bigall ........................ 74/551.3 |
| 5,387,255 A | | 2/1995 | Chiang ....................... 74/551.1 |
| 5,408,900 A | * | 4/1995 | Marui ........................ 74/551.4 |
| 5,442,973 A | | 8/1995 | Liao .......................... 74/551.1 |
| 5,465,634 A | * | 11/1995 | Chen .......................... 74/551.3 |
| 5,517,878 A | | 5/1996 | Klein et al. ................. 74/551.3 |
| 5,678,458 A | | 10/1997 | Kao ........................... 74/551.3 |
| 5,715,903 A | * | 2/1998 | Summers et al. ............ 403/389 |
| 5,779,253 A | | 7/1998 | Lee ............................ 280/279 |
| 5,842,385 A | * | 12/1998 | Su ............................. 74/551.3 |
| 5,851,459 A | * | 12/1998 | Chen .......................... 264/46.7 |
| 6,058,800 A | * | 5/2000 | Giard ......................... 74/551.1 |

\* cited by examiner

Primary Examiner—Lynne H. Browne
Assistant Examiner—John B. Walsh
(74) Attorney, Agent, or Firm—J. Andrew McKinney, Jr.

(57) ABSTRACT

A twisted bicycle stem includes first and second substantially identical helically twisted clamping members fastened together using four threaded fasteners received in four corresponding threaded apertures. The assembled twisted stem defines a vertical cylindrical receiving aperture and an opposing substantially horizontal cylindrical receiving aperture having a central axis offset by 90° with respect to the central axis of vertical receiving aperture. The two helically twisted clamping members each comprise one-half of the finished stem structure for receiving the substantially horizontal handlebar and the substantially vertical steerer tube. First and second helically twisted clamping members are preferably manufactured of an engineering plastic, preferably reinforced with a 50% glass fiber fill or carbon fiber fill using high tensile strength filaments. Each of the helically twisted clamping members preferably includes a twisted longitudinal external scoop or groove and functions as a twisted I-beam, thereby saving material and weight and providing a shape which permits the helically twisted clamping members to be molded in plastic and removed from the mold. A plurality of identical helically twisted clamping members are preferably fabricated in a single mold and two members are used to fabricate a twisted bicycle stem. The transverse extent of the scoop is bounded by first and second opposing ribs, also helically twisted in a 90° turn or quarter twist. In an alternative embodiment, the helically twisted clamping members are machined from titanium, aluminum, steel or the like.

18 Claims, 12 Drawing Sheets

FIG.12　BOTTOM

FIG.13　RIGHT

CANTILEVERED HELICALLY TWISTED BICYCLE STEM CLAMP

This is a continuation-in-part of U.S. provisional application serial No. 60/062,795, filed Oct. 24, 1997.

BACKGROUND OF THE INVENTION

1. Field of the Invention

The present invention pertains to an improved bicycle stem clamping structure for providing a cantilevered support for a handlebar, especially for mountain bikes or the like.

2. Discussion of the Prior Art

Bicycles include handlebars to apply directional control to a front fork and wheel, for steering the bicycle. A front fork includes a substantially vertical steering or steerer tube inserted coaxially within the head tube of the bicycle frame. A bicycle handlebar stem is usually supported within a fork steerer tube and retained therein by an offset expander wedge providing pressure applied by an expander bolt. The stem also normally includes a roughly horizontal, cantilevered support portion terminating in a transverse stem clip which, along with a binder bolt, can be used to clamp a substantially horizontal handlebar in place. The handlebar, as is well known in the art, is used to steer the bicycle; the stem, combining the horizontal cantilevered portion and the vertical portion within the steerer tube, provides one method for supporting the handlebar and applying pressure from the handlebar to the front fork for steering the bicycle. A number of attempts have been made to provide greater support for mountain bike handlebars which frequently endure greater stress in technical riding, competition or the like. In particular, the ball type handlebar, popular in the late eighties, incorporated the handlebar and stem into a one piece unit including an expander bolt and an expander wedge for clamping the handlebar and integral stem into the steerer tube. A number of problems were observed with the ball type handlebar, including a lack of adjustability.

Others trying to solve the problems inherent in mountain bike handlebar mounting and adjustment created the "Aheadset™" bicycle stem including a steerer tube attachment, a substantially horizontal stem member, and a removable handlebar clamping member, thereby providing added flexibility in bike fit but incorporating a complicated and inherently weaker structure into a mechanism for mounting a handlebar to a mountain bike.

There is a need, therefore, to provide a strong, mechanically robust and yet simple structure for mounting a mountain bike handlebar onto steerer tube which permits easy adjustability.

OBJECTS AND SUMMARY OF THE INVENTION

Accordingly, it is a primary object of the present invention to overcome the above mentioned difficulties by providing a strong, mechanically robust and yet elegantly simple structure for mounting a mountain bike handlebar onto steerer tube while permitting convenient adjustment.

Another object of the present invention is to mount a handlebar onto a bicycle with an economically manufactured clamping structure.

Yet another object of the present invention is adjustably clamping a handlebar onto a bicycle in an aesthetically pleasing, rigid clamping structure made from a selected material, thereby allowing the user to select the structure and material best suited to their riding style and budget.

The aforesaid objects are achieved individually and in combination, and it is not intended that the present invention be construed as requiring two or more of the objects to be combined unless expressly required by the claims attached hereto.

In accordance with the present invention, a bicycle stem clamping structure is readily manufactured in two matching parts. A twisted bicycle stem includes first and second helically twisted clamping members fastened together using four threaded fasteners received in four corresponding threaded apertures. The assembled twisted stem defines, at one end, a vertical cylindrical receiving aperture opposite, at the other end, a transverse, substantially horizontal cylindrical receiving aperture having a central axis offset by 90°, or in perpendicular relation, with the central axis of vertical receiving aperture. The first and second helically twisted clamping members each comprise one-half of the finished stem structure for receiving the substantially horizontal handlebar and the substantially vertical steerer tube.

The first and second helically twisted clamping members are preferably manufactured of steel, aluminum, titanium, magnesium or thermoplastic or plastic engineering resin such as Grivory GV-5H™ brand reinforced thermoplastic, preferably reinforced with a 50% glass fiber fill or carbon fiber fill using high tensile strength filaments.

Each of the helically twisted clamping members includes a twisted longitudinal external scoop or groove and functions as a twisted I-beam, thereby saving material and weight and providing a shape which permits the helically twisted clamping members to be cast or molded and removed from the mold with both mold and cast or molded clamping member intact. A plurality of identical helically twisted clamping members are preferably fabricated in a single mold and two members are used to fabricate a twisted bicycle stem. The transverse extent of the scoop is bounded by first and second opposing ribs, also helically twisted in a 90° turn or quarter twist.

In an alternative embodiment, the helically twisted clamping member vertical receiving aperture and horizontal receiving aperture are defined by first and second sleeves fabricated from aluminum, titanium, thermoplastic or thermoset plastic. The first and second helically twisted clamping members have helically twisted inwardly facing surfaces which, in the assembled twisted bicycle stem, are in intimate contact with one another. In an alternative embodiment, an aluminum, titanium or steel sheet is incorporated into each helically twisted clamping member on the inwardly facing surface, thereby imparting additional strength to the finished twisted bicycle stem. In another alternative embodiment, each helically twisted clamping member has a pin or tab and corresponding symmetrically disposed hole or slot on an inwardly facing surface, where the hole is adapted to receive the pin on the mating helically twisted clamping member or the slot is adapted to receive the tab on the mating helically twisted clamping member, thereby assisting in aligning and indexing the first and second helically twisted clamping members and providing additional mechanical support to the resulting twisted bicycle stem structure.

The helically twisted clamping members may alternatively be machined from titanium, aluminum, steel or the like. Machined helically twisted members can be substantially hollow inside, thereby defining a cavity, once assembled into a finished twisted bicycle stem. For those embodiments having removable sleeves, the user has additional flexibility since the sleeves can be sized to receive different vertical stem tube and handlebar diameters. The length of each sleeve can be varied to provide greater adjustment in rise or stack height. The length between the vertical cylindrical receiving aperture and horizontal cylindrical receiving aperture (i.e., the distance between the central axes of the receiving apertures) can be varied to give a twisted bicycle stem of any desired stem extension (from steerer tube to handlebar). A steerer tube of any desired length and diameter can then be received in the vertical cylindrical receiving aperture and a handlebar of any desired diameter can be received in the horizontal cylindrical receiving aperture. Thus, helically twisted clamping members each comprise one-half of the finished stem structure for receiving the handlebar and the steerer tube. In the preferred embodiment, the helically twisted clamping members are substantially identical and are therefore more economical to manufacture than differing parts. Removal of threaded fasteners permits simultaneous removal of the stem and handlebar, thereby allowing rapid changes in equipment or ease of access to individual parts for ease of maintenance.

A machined, twisted bicycle stem is assembled using threaded fasteners received in threaded apertures and clamping a substantially horizontal handlebar that is separated by a stem extension distance from a substantially vertical steerer tube supported within a bicycle frame by a headset. The stem extension distance between the horizontal receiving aperture and the vertical receiving aperture are preferably in the range of 50 millimeters to 150 millimeters. Preferably, the threaded fasteners are metallic fastening bolts positioned in front and in back of the steerer tube and in front and in back of the handlebar, to provide a powerful clamping force on the steerer tube and on the handlebar when fastened to join the two helically twisted clamping members or halves together. The helical form and the incorporated reinforcing sleeves and gussets resist flexing movement under dynamic loading and provide a rigid and responsive ride to the bicyclist. Steering accuracy and control in demanding or highly technical riding situations are therefore enhanced. By providing two identical halves in the stem structure, quick and easy breakdown of the front of the bicycle are provided. This also permits easy breakdown for maintenance or for transport in limited space. Slotted sleeves or shims can be used to resist crimping of the handlebar and fork steerer tube by dissipating stress during dynamic loading. The fork steerer sleeve may be cut in different lengths for use in different stack height/steerer length configurations and is preferably cut to a selected length allowing for proper vertical tightening of the head set without exerting direct pressure on the two main halves of the stem.

Another embodiment of the stem of the present invention has a central body portion formed as a helically twisted solid central portion terminated at a proximal end in a first hinged clamping member adapted to clamp on and retain a substantially vertical steerer tube, and terminated in a distal end in a second hinged clamping member adapted to clamp on and retain a substantially horizontal handlebar. The first and second hinged clamping members are each releasably fastened to the solid central portion using one or more threaded fasteners.

The stem design of the present invention may be retrofitted to a threaded head set/steerer tube configuration by substituting an unslotted, hollow quill with an expanding wedge and tightening bolt for the fork steerer sleeve used in threadless headset/steerer applications. Fastening of the two helically twisted clamping member halves will be identical for both types of assemblies, however, tightening the stem wedge bolt is necessary for a secure fitting with threaded headset/steerer configurations.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 1:
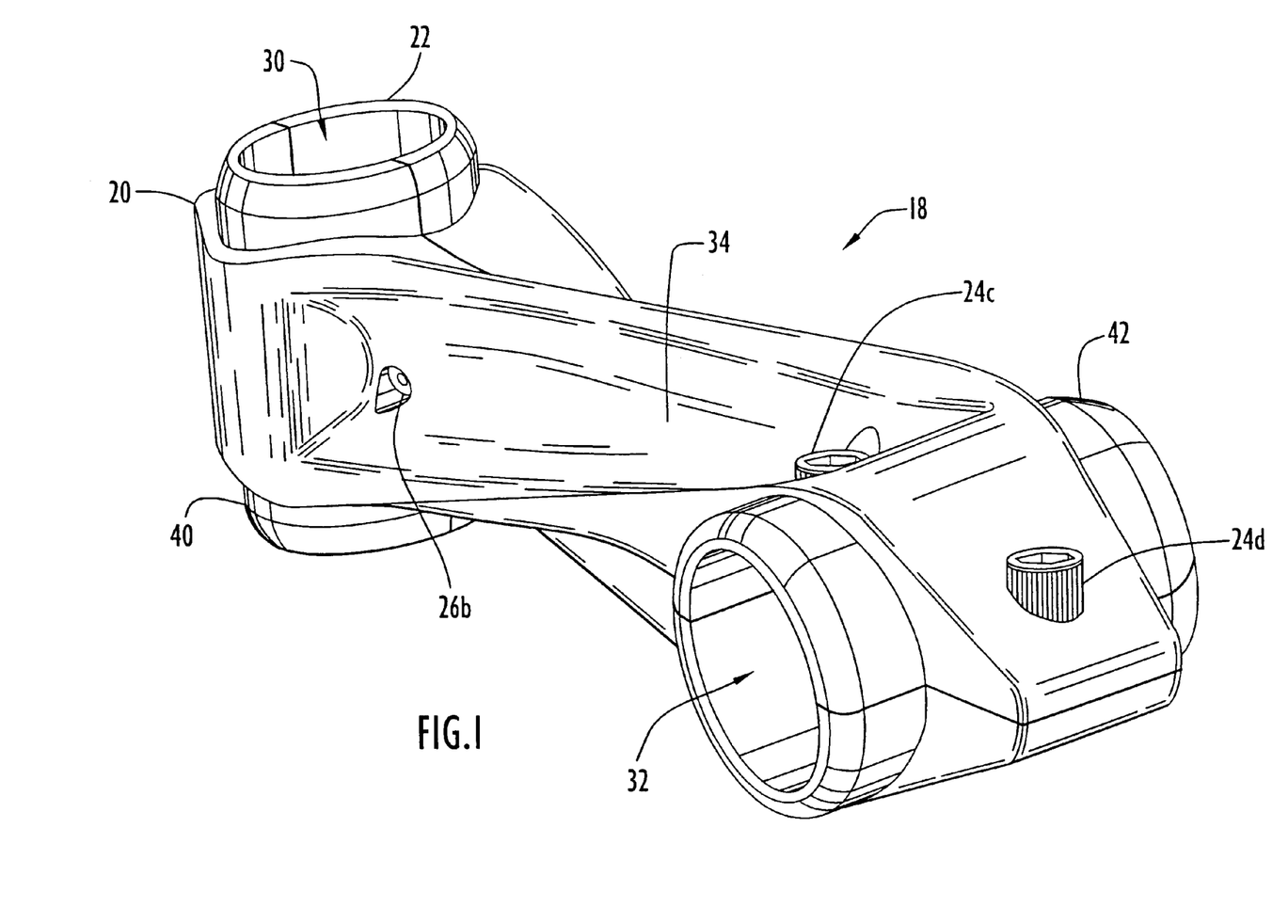
FIG. 1 is a perspective illustration of the helically twisted bicycle stem of the present invention including first and second helically twisted clamping members.

The present invention relates to a bicycle stem structure readily manufactured in two matching parts. As shown in FIGS. 1, 2, 3, 4, 5, 6, 7 and 8, twisted bicycle stem 18 includes first and second helically twisted clamping members 20, 22 releasably fastened together using, for example, four threaded fasteners or bolts 24a, 24b, 24c, 24d received in four corresponding threaded apertures 26a, 26b, 26c, 26d. Stem 18, as shown in FIG. 1, is an elongate structure having a longitudinal axis and is twisted along the longitudinal axis and divided along the longitudinal axis.

Figure 2:
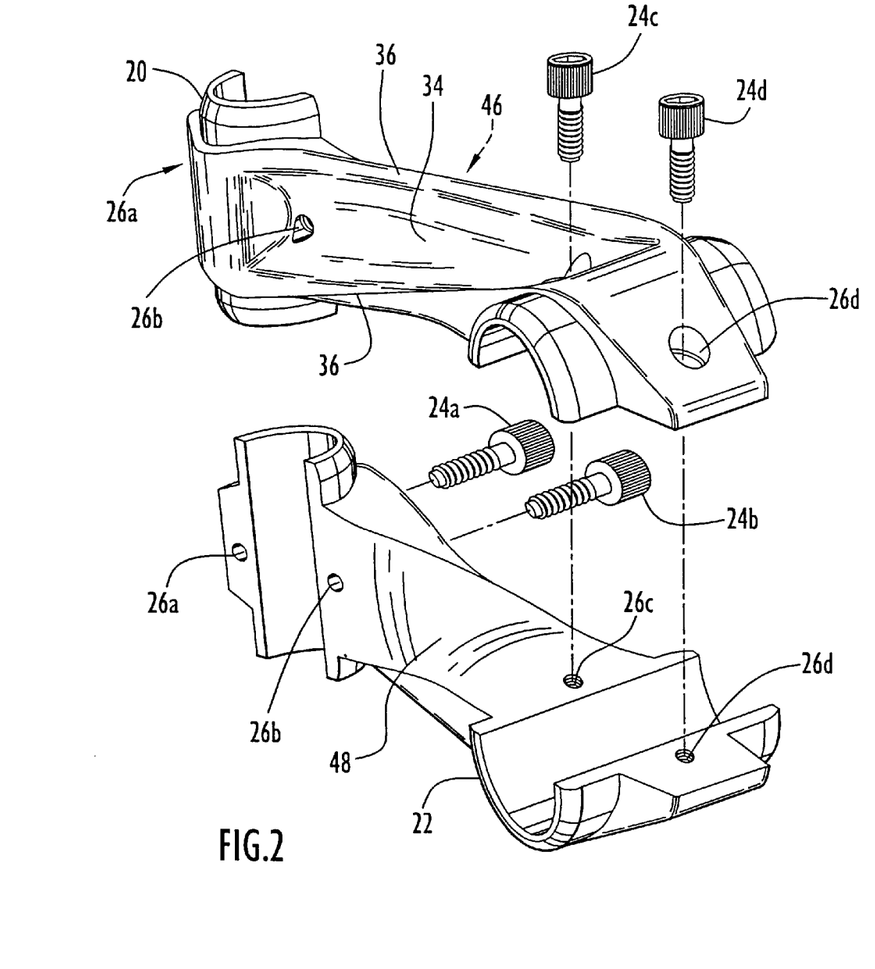
FIG. 2 is an exploded perspective illustration of the helically twisted bicycle stem of FIG. 1.

As shown in FIG. 1, the assembled twisted stem 18 defines, at one end, a vertical cylindrical receiving aperture or bore 30 opposite, at the other end, a substantially horizontal cylindrical receiving aperture or bore 32 having a central axis offset by 90°, or in perpendicular relation, with the central axis of vertical receiving aperture 30. The central axes of cylindrical receiving apertures 30, 32 preferably are each transverse to and intersect the stem longitudinal axis. As shown in FIGS. 1 and 2, cylindrical aperture 30 has a first threaded fastener 24a disposed between the cylindrical aperture 30 and the distal end of stem 18 and a second threaded fastener 24b disposed adjacent the cylindrical aperture 30 and opposite first threaded fastener 24a. Similarly, horizontal cylindrical aperture 32 has a threaded fastener 24d disposed between the cylindrical aperture 32 and the proximal end of stem 18 and a threaded fastener 24c disposed adjacent the cylindrical aperture 32 and opposite threaded fastener 24d. Clamping force is thus applied at the cylindrical apertures 30, 32 by threaded fasteners or the like on opposing sides thereof.

More generally, stem clamp 18 has a longitudinal axis and includes a first helically twisted clamping member 20 having a first end opposite a second end, the first end being disposed parallel to a first plane intersecting the longitudinal axis and having a first substantially semi-cylindrical groove therein with an axis parallel to said first plane, the second end being disposed parallel to a second plane disposed substantially perpendicularly to the first plane and having a second substantially semi-cylindrical groove therein with an axis parallel to the second plane. The stem 18 also includes a second helically twisted clamping member 22 having a first end opposite a second end, the first end being disposed parallel to a first plane intersecting the longitudinal axis and having a first substantially semi-cylindrical groove 31 therein with an axis parallel to the first plane, the second end being disposed parallel to a second plane disposed substantially perpendicularly to the first plane and having a second substantially semi-cylindrical groove 33 therein with an axis parallel to the second plane. The first and second helically twisted clamping members 20, 22 are juxtaposed and the semi-cylindrical grooves are aligned to define first and second transverse apertures 30, 32 therethrough, where the first aperture is preferably sized to receive a handlebar and the second aperture is preferably sized to receive a steerer tube.

Figure 3:
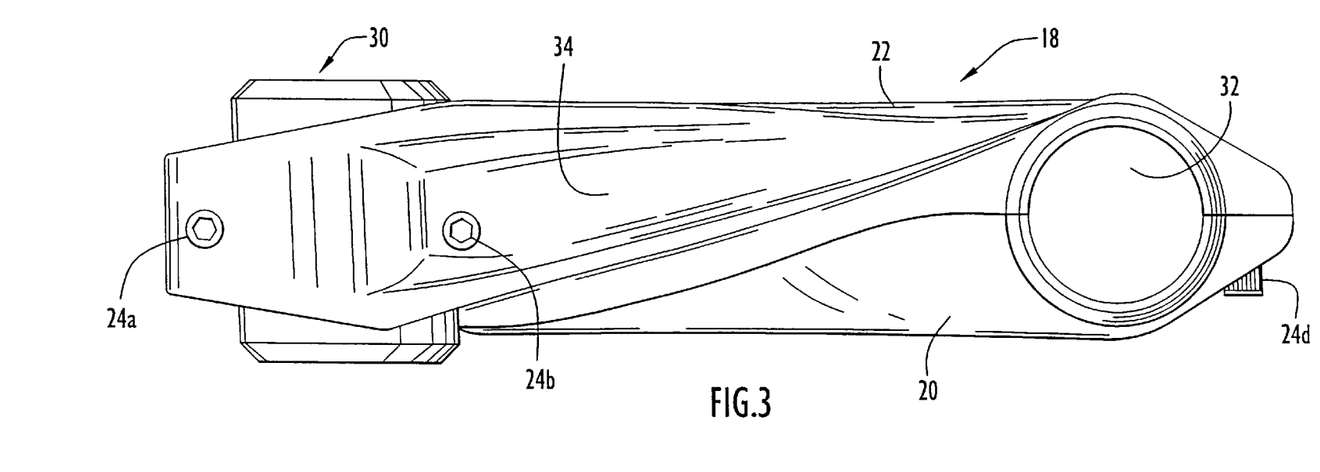
FIG. 3 is a side view of the helically twisted bicycle stem of FIGS. 1 and 2.
Figure 4:
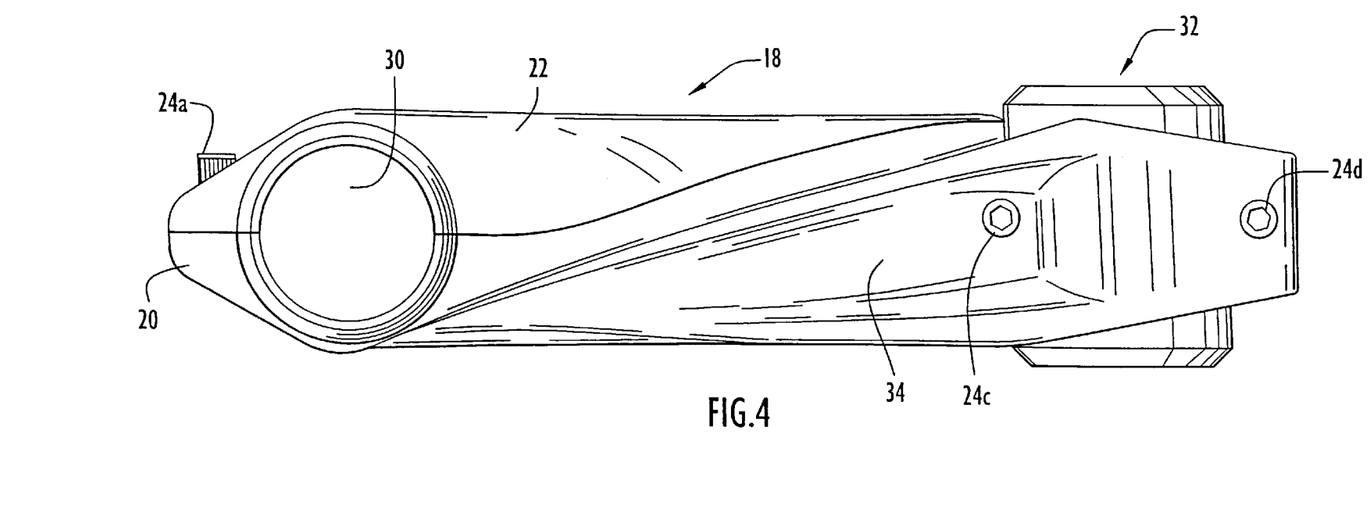
FIG. 4 is a top view of the helically twisted bicycle stem of FIGS. 1 and 2.
Figure 5:
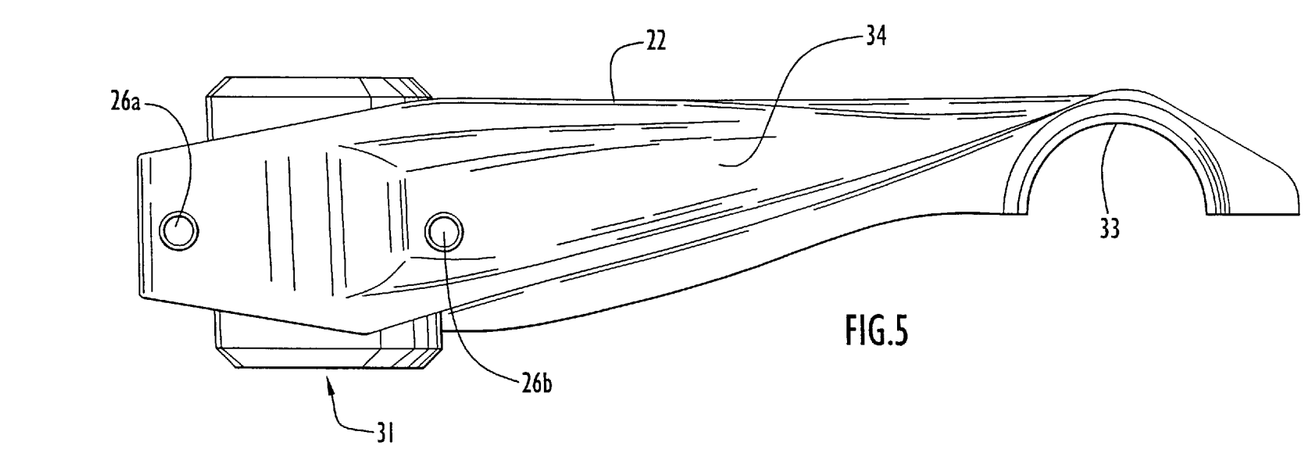
FIG. 5 is a side view of the second helically twisted clamping member of FIGS. 1, 2, 3 and 4.

First and second helically twisted clamping members 20, 22 are preferably manufactured of a plastic engineering resin such as Grivory GV-5H™ brand reinforced thermoplastic, preferably reinforced with a 50% glass fiber fill or carbon fill using high tensile strength filaments. Each of the helically twisted clamping members 20, 22 includes a twisted longitudinal external scoop or groove 34 and so each clamping member functions as a twisted I-beam, thereby saving material and weight and providing a shape which permits the helically twisted clamping members 20, 22 to be molded in plastic or cast in metal and removed from the mold in one piece without destroying the mold. As best seen in FIGS. 3, 4 and 5, the transverse extent of scoop 34 is bounded by first and second opposing ribs 36, also helically twisted in a 90° or ¼ turn around the longitudinal axis.

Figure 6:
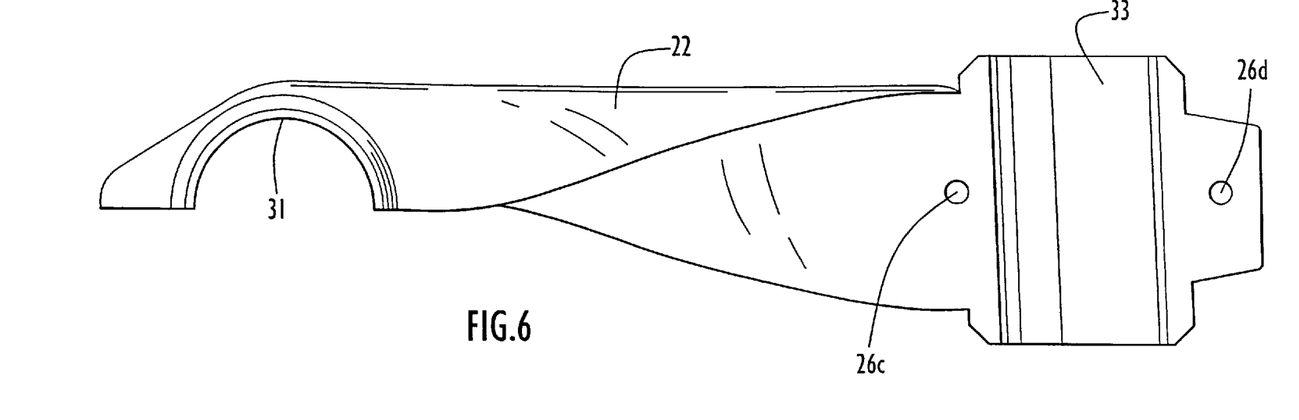
FIG. 6 is a top view of the second helically twisted clamping member of FIGS. 1, 2, 3 and 4.
Figure 7:
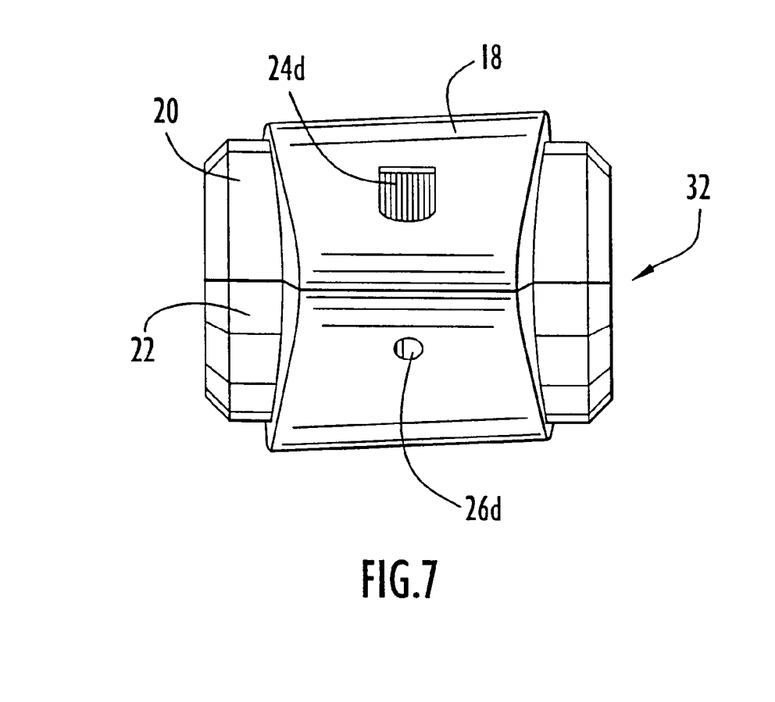
FIG. 7 is an end view of the helically twisted bicycle stem of FIGS. 1 and 3, as viewed along the stem longitudinal axis.
Figure 8:
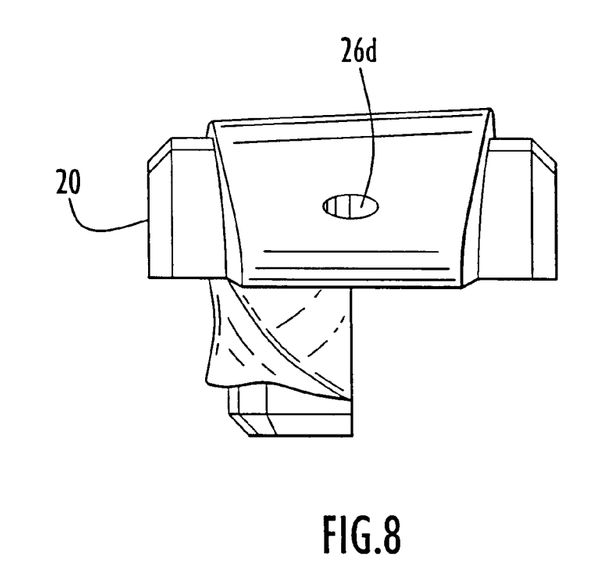
FIG. 8 is an end view of the first helically twisted clamping member of FIGS. 1 and 3, as viewed along the stem longitudinal axis.
Figure 9:
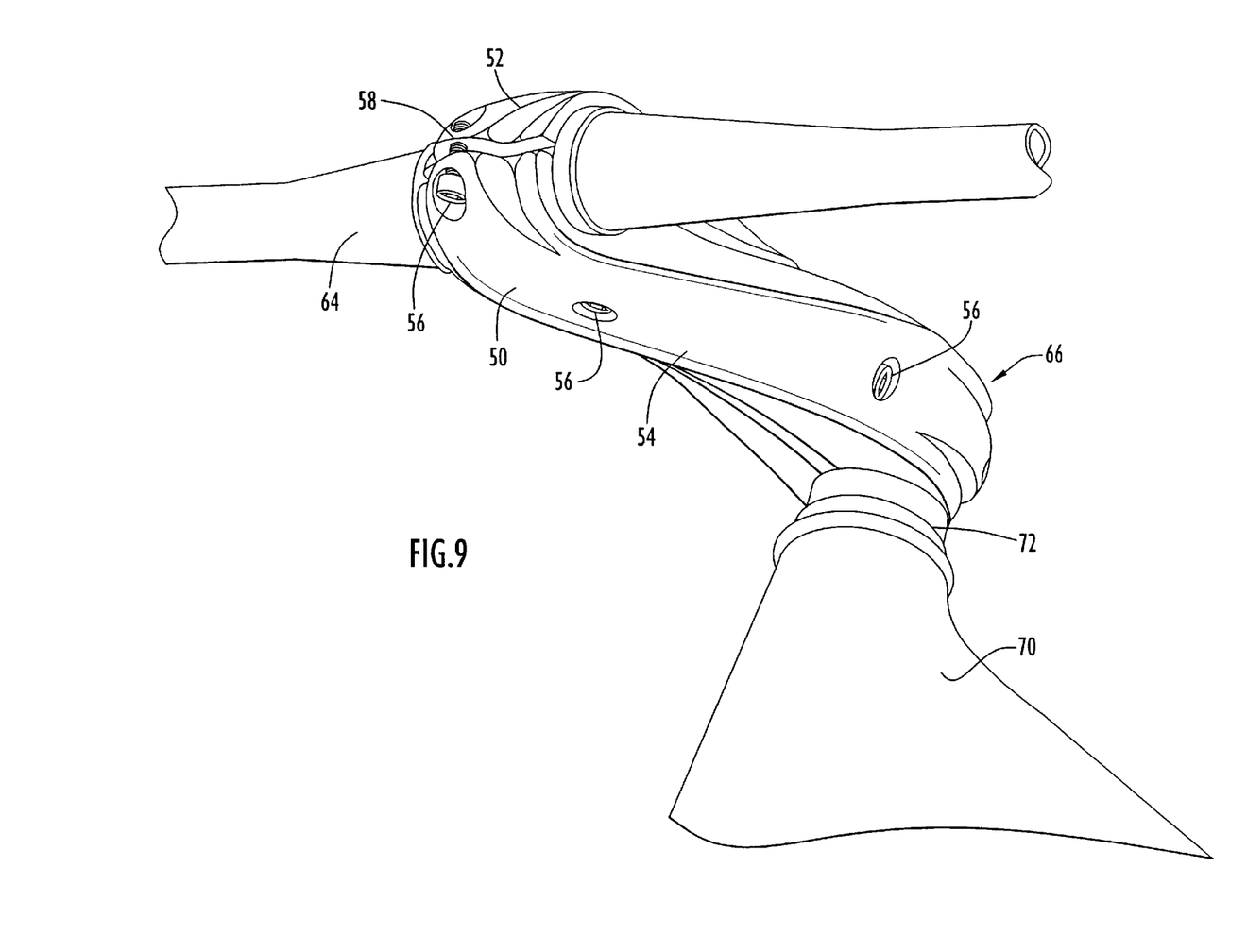
FIG. 9 is a perspective illustration of an alternative embodiment of the helically twisted bicycle stem of the present invention including first and second helically twisted clamping members and unbonded, removable, handlebar sleeve, as affixed to a bicycle handlebar and steerer tube.
Figure 10:
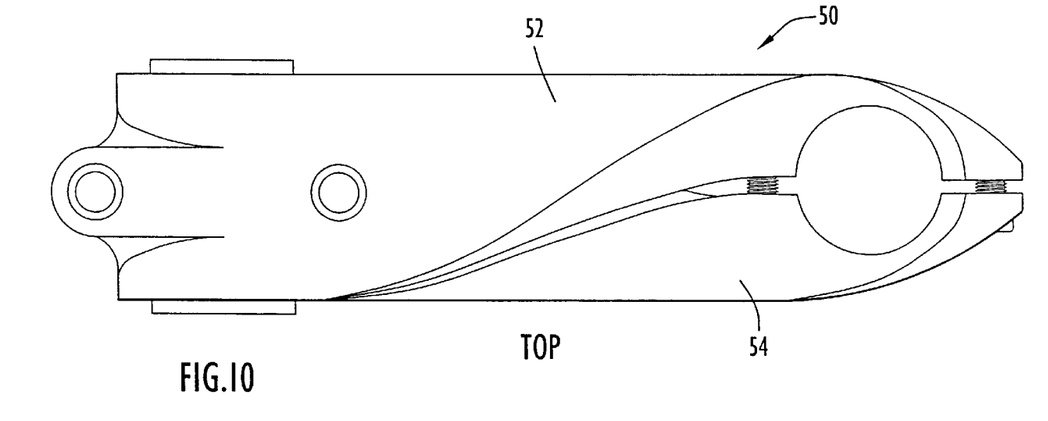
FIG. 10 is a top view of the helically twisted bicycle stem of FIG. 9.
Figure 11:
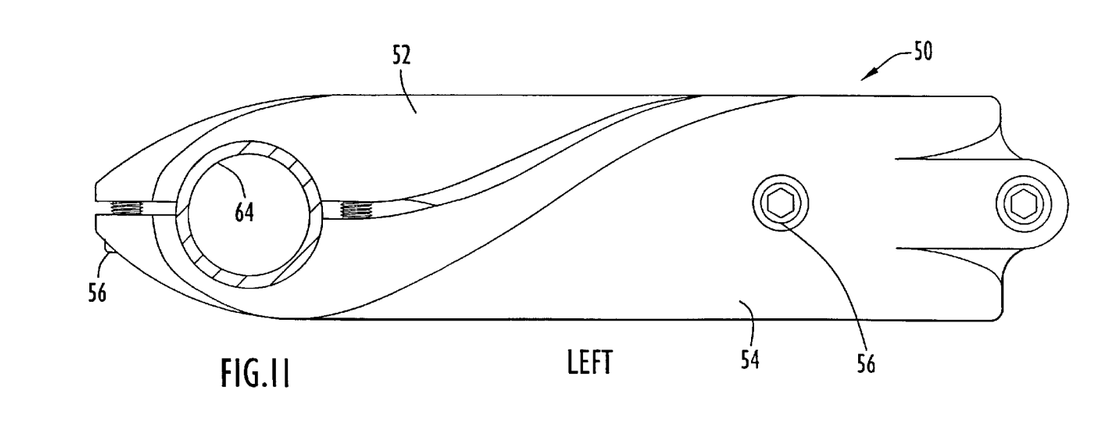
FIG. 11 is a left view of the helically twisted bicycle stem of FIG. 9.
Figure 12:
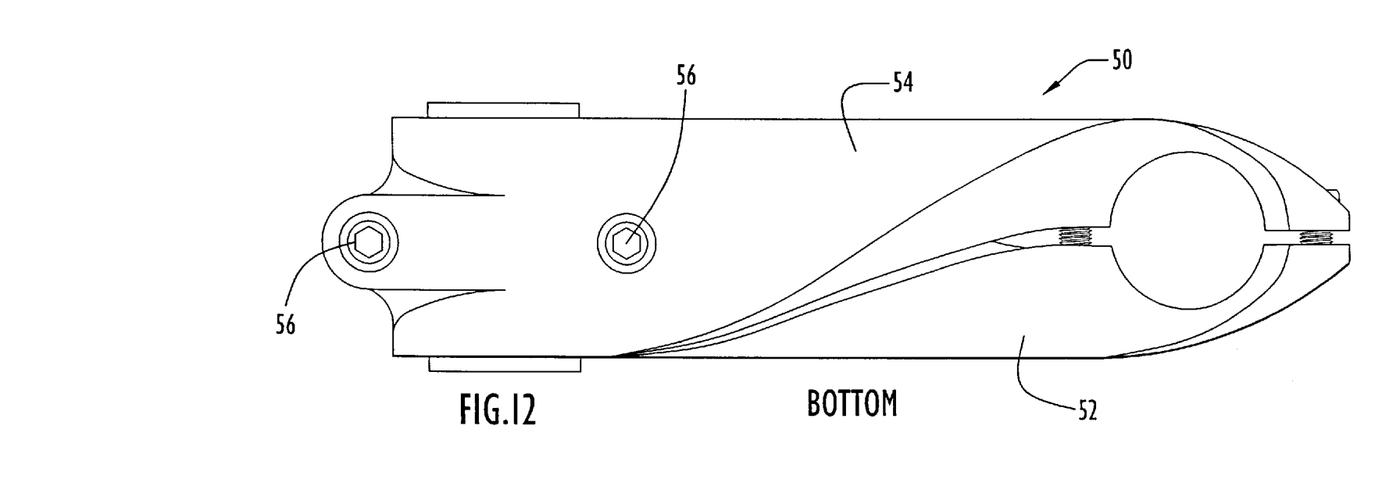
FIG. 12 is a bottom view of the helically twisted bicycle stem of FIG. 9.
Figure 13:
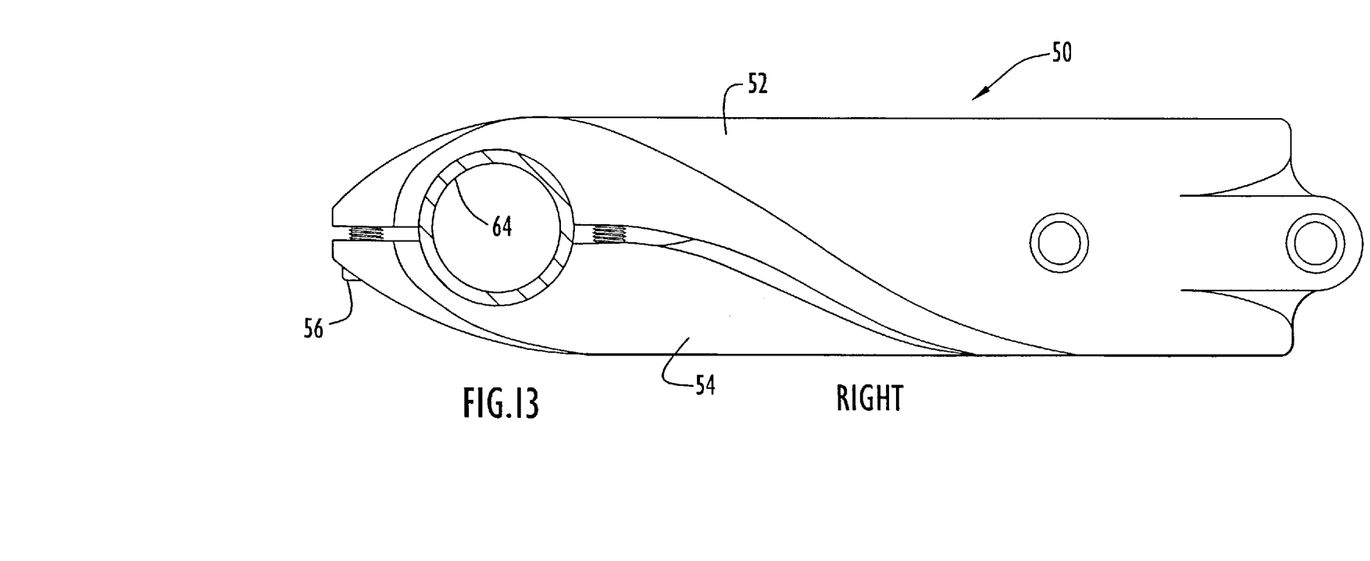
FIG. 13 is a right view of the helically twisted bicycle stem of FIG. 9.
Figure 14:
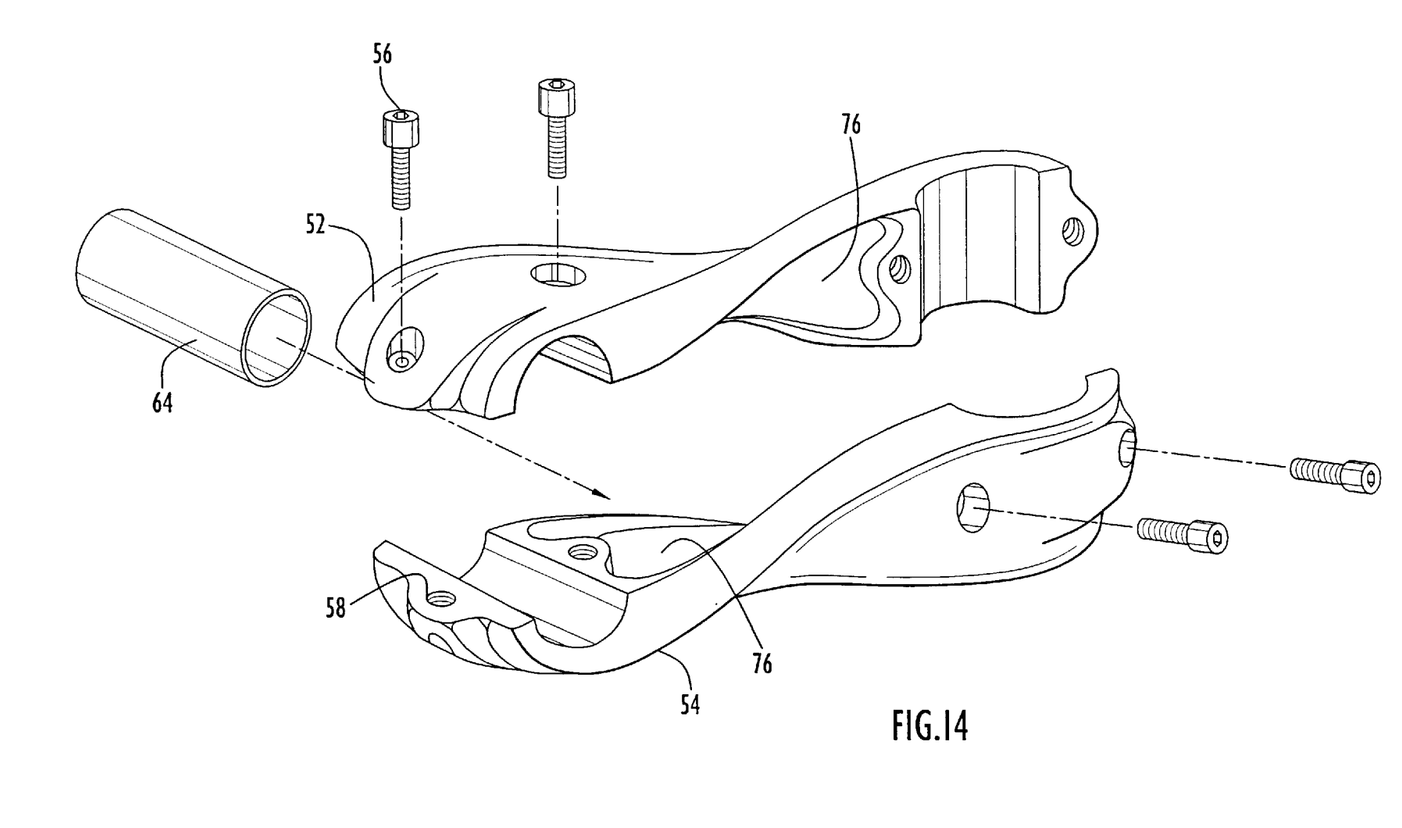
FIG. 14 is an exploded perspective illustration of the helically twisted bicycle stem of FIG. 9.
Figure 15:
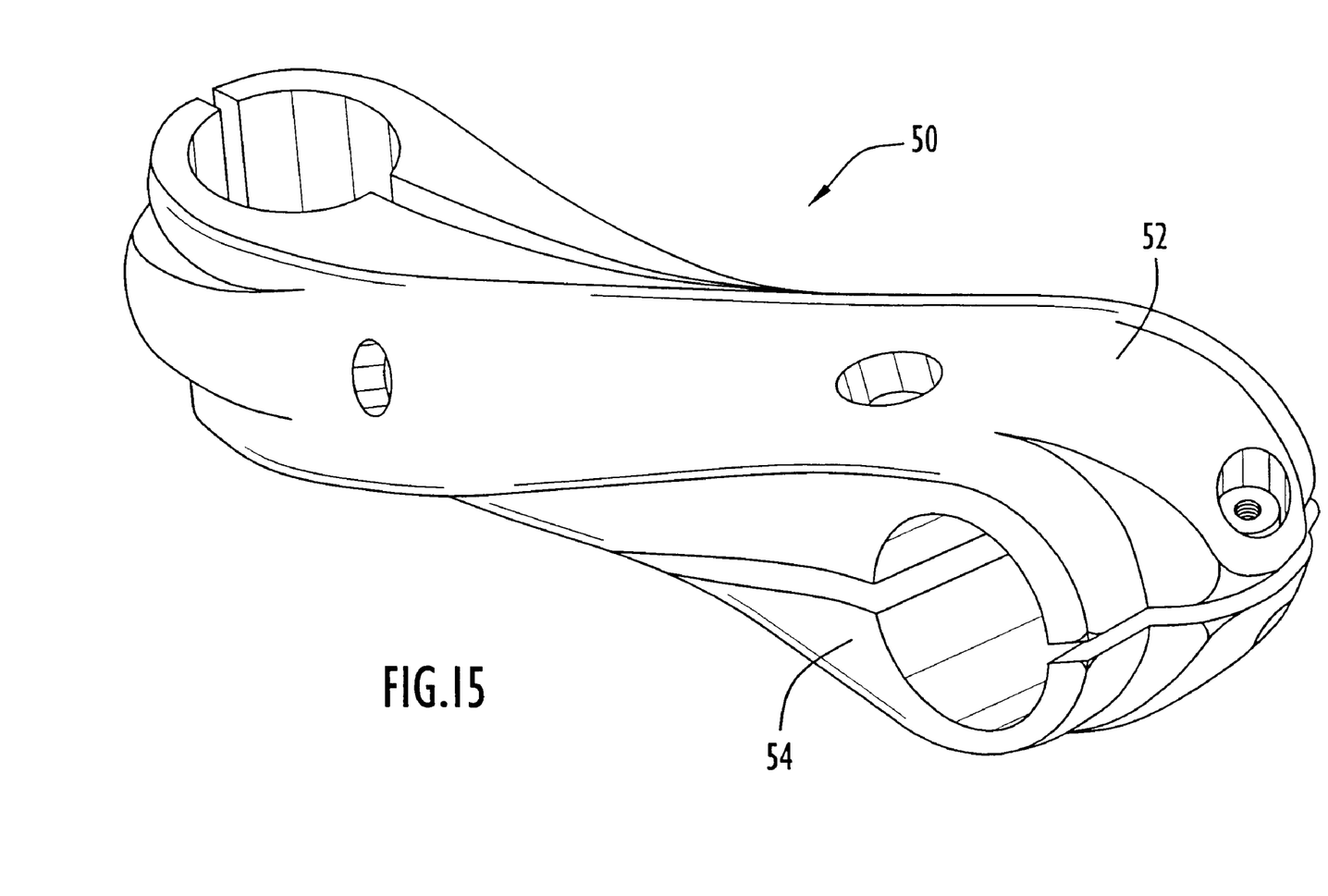
FIG. 15 is a perspective illustration of the helically twisted bicycle stem of FIG. 9, including first and second helically twisted clamping members, without bonded or unbonded reinforcing sleeves.

FIG. 3 is a side view of the helically twisted bicycle stem 18 and FIG. 4 is a top view, illustrating that the central axes of apertures 30 and 32 are perpendicular to one another and transverse to the longitudinal axis of stem 18. Similarly, FIG. 5 is a side view of the second helically twisted clamping member 22 and FIG. 6 is a top view, illustrating that the central axes of grooved, semi cylindrical surfaces 31, 33 (comprising apertures 30, 32 in an assembled stem 18) are perpendicular to one another and transverse to the longitudinal axis. Preferably, apertures 26a, 26b, 26c and 26d are transverse to and disposed along the longitudinal axis of stem 18.

In an alternative embodiment, the helically twisted clamping member vertical receiving aperture 30 and horizontal receiving aperture 32 are defined by first and second pairs of split cylindrical sleeve members having transverse projections disposed as the projecting portions 40, 42 are disposed but fabricated from aluminum or titanium and bonded into the receiving ends of helically twisted clamping members 20, 22 using epoxy, or being ultrasonically welded thereto.

As shown in FIG. 2, the first and second helically twisted clamping members 20, 22 have helically twisting or angularly varying inwardly facing surfaces 46, 48 twisting one quarter turn along the stem longitudinal axis and which, in the assembled twisted bicycle stem 18, are in intimate contact with one another.

In an alternative embodiment, an aluminum sheet is incorporated into each helically twisted clamping member 20, 22, upon the angularly varying inwardly facing surface 46, 48, thereby imparting additional strength to the finished twisted bicycle stem. In another alternative embodiment, each helically twisted clamping member (e.g., 20) has upon a inwardly facing surface (e.g., 46) an inwardly projecting pin or tab (not shown) and a hole or slot (not shown) where the hole is adapted to receive the pin on the mating helically twisted clamping member (e.g., 22) or, the slot is adapted to receive the tab on the mating helically twisted clamping member, thereby assisting in aligning and indexing the first and second helically twisted clamping members and providing additional mechanical support to the resulting twisted bicycle stem structure.

The helically twisted clamping member used in making the bicycle stem of the present invention is preferably cast or molded in a single mold and two substantially identical members are used to fabricate a twisted bicycle stem. The helically twisted clamping members may be cast or molded from plastic reinforced with carbon fiber or fiber glass or may be cast or machined from titanium, aluminum, steel or the like.

For those embodiments (e.g., as in FIGS. 1–8) having removable metal sleeves (e.g., projecting transversely as projecting portions 40, 42 do) the user can choose from a range of steerer tube and handlebar sizes, since the sleeves can be sized to receive different vertical steerer tubes and handlebar diameters. The axial length of each metal sleeve can be varied to provide greater adjustment in rise or stack height. The length between the vertical cylindrical receiving aperture 30 and horizontal cylindrical receiving aperture 32 (i.e., the distance between the central axes of the receiving apertures) can be varied to give a twisted bicycle stem of any desired stem extension. A steerer tube of any desired length and diameter can then be received in vertical cylindrical receiving aperture 30 and a handlebar of any desired diameter can be received in horizontal cylindrical receiving aperture 32. Thus, helically twisted clamping members 20, 22 each comprise one-half of the finished stem structure for receiving the handlebar and one-half of the structure for receiving the steerer tube. In the preferred embodiment, the helically twisted clamping members 20, 22 are substantially identical and are therefore more economical to manufacture. Removal of threaded fasteners 24 permits simultaneous removal of the stem and handlebar, thereby allowing rapid changes in equipment or ease of access to individual parts for ease of maintenance.

Machined helically twisted members 52, 54 may be fabricated in the shape shown in FIGS. 9, 10, 11, 12, 13, 14, 15 or 16 and can be substantially hollow inside thereby defining an interior cavity, once assembled into a finished twisted bicycle stem 50. As illustrated in FIGS. 9–15 a machined twisted bicycle stem 50 includes first and second helically twisted clamping members 52, 54 assembled using steel or titanium allen-head bolts or other suitable threaded fasteners 56 received in threaded apertures 58 and thereby clamping a handlebar 64 in a substantially horizontal orientation and separated by a stem extension distance from a substantially vertical steerer tube 66 supported in bicycle frame 70 by a headset 72. As noted above, first and second machined helically twisted clamping members 52, 54 each include a hollowed or scooped surface 76 defined within the respective inwardly facing surfaces, thereby providing a stem support member of reduced weight.

Figure 16:
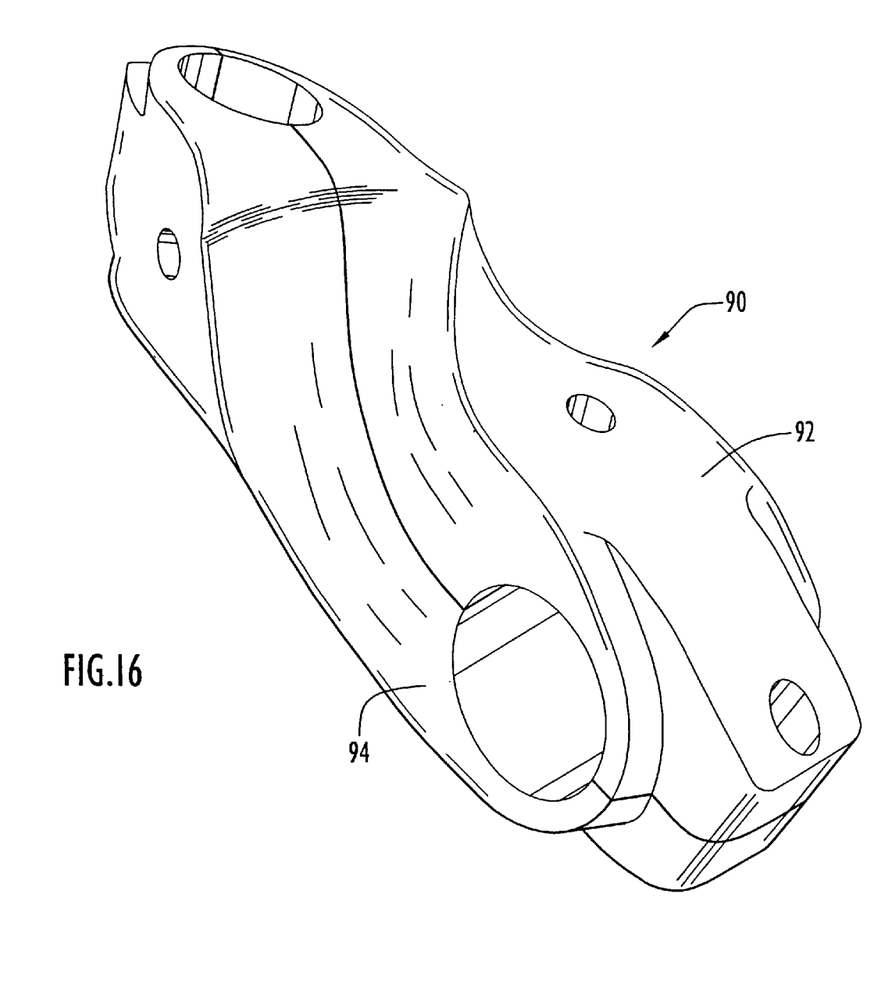
FIG. 16 is a perspective illustration of a third embodiment of the helically twisted bicycle stem of the present invention including first and second helically twisted clamping members.

FIG. 16 illustrates another embodiment of a machined twisted bicycle stem 90 with first and second machined helically twisted clamping members 92, 94, each preferably including a hollowed or scooped surface defined within the respective inwardly facing surfaces, thereby providing a stem support member of reduced weight.

The stem extension between the horizontal receiving aperture and the vertical receiving aperture is user selectable for optimal bicycle fit and is preferably in the range of 50 millimeters to 150 millimeters from the central axis of the handlebar to the central axis of the steerer tube.

For those embodiments including split reinforcing sleeves, each sleeve is two parts and therefore each sleeve half is included as a half cylinder at each clamping member end. The interior surfaces of the sleeves contacting the handlebar and steerer tube are preferably grooved or knurled to increase clamping power, friction or bite into steerer tube surfaces and handlebar surfaces. The sleeves may optionally be formed of composite material and are extruded with an outer profile adapted for secure bonding into the concave or semi-cylindrical receiving portions at the ends of the helically twisted clamping members. Preferably, the threaded fasteners are metallic fastening bolts positioned in front and in back of the steerer tube and in front and in back of the handlebar, to provide a powerful clamping force on the steerer tube and on the handlebar when fastened to join the two helically twisted clamping members or halves together.

The twisted bicycle stem of the present invention therefore includes two halves which, when joined to form two sides of a separable helically twisted part define first and second ends oriented perpendicularly to each other for accepting tubular structures of the handlebar and fork steerer tube in a threadless headset configuration. The helical form and the incorporated reinforcing sleeves and gussets resist flexing movement under dynamic loading and provide a rigid and responsive ride to the bicyclist. Steering accuracy and control in demanding or highly technical riding situations are therefore enhanced. By providing two identical halves in the stem structure, quick and easy breakdown of the front of the bicycle are provided. This also permits easy breakdown for maintenance or for transport in limited space. Slotted sleeves or shims can be used to resist crimping of the handlebar and fork steerer tube by dissipating stress during dynamic loading. The fork steerer sleeve (e.g., 40) may be cut in different lengths for use in different stack height/steerer length configurations. The fork steerer sleeve is preferably cut to a selected length allowing for proper vertical tightening of the head set without exerting direct pressure on the two main halves of the stem.

Figure 17:
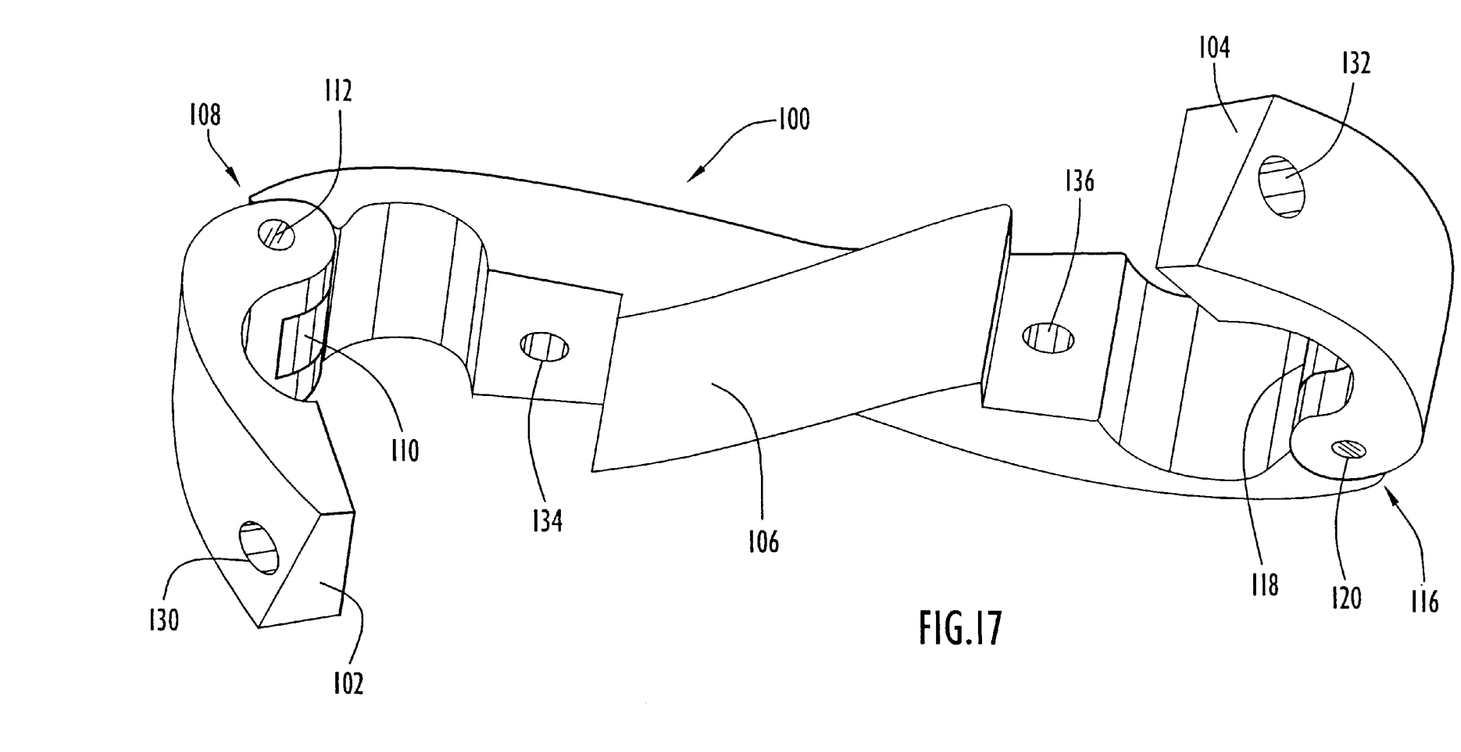
FIG. 17 is a perspective illustration of a fourth embodiment of the helically twisted bicycle stem of the present invention including first and second hinged clamping members.

FIG. 17 is a perspective illustration of the another embodiment of the helically twisted bicycle stem 100 including first and second hinged clamping members 102, 104. Twisted stem 100 has a central body portion 106 formed as a helically twisted solid terminated at a proximal end 108 in a first hinge 110 with a hinge pin 112 carrying clamping member 102 and adapted to clamp on and retain a substantially vertical steerer tube. Central body portion 106 is also terminated in a distal end 116 in a second hinge 118 with a hinge pin 120 carrying clamping member 104 and adapted to clamp on and retain a substantially horizontal handlebar. First and second hinged clamping members 102, 104 are each releasably fastened to the solid central portion using one or more bolts or threaded fasteners (not shown) which are received through clamping member apertures 130, 132 and threadably received in body portion apertures 134, 136. Twisted stem 100 is preferably made from an engineering plastic and may optionally have a textured or ribbed exterior surface.

The twisted stem design of the present invention is molded, cast or machined in any metal or plastic alloy or compound that is also a suitable building material for structural parts of the bicycle, such as aluminum, titanium, steel, magnesium and beryllium alloys as well as thermoset plastic and thermoplastic resins optionally reinforced with carbon, glass or ceramic fibers and/or with particles. Preferably, metallic inserts are incorporated into the thermoset or thermoplastic embodiments, thereby providing adequate resistance to torque applied in fastening the bolts. The stem design of the present invention may be retrofitted to a threaded head set/steerer tube configuration by substituting an unslotted, hollow quill with an expanding wedge and tightening bolt for the fork steerer sleeve used in threadless headset/steerer applications. Fastening of the two helically twisted clamping member halves will be identical for both types of assemblies, however, tightening the stem wedge bolt is necessary for a secure fitting with threaded headset/steerer configurations.

For purposes of clarity in nomenclature, by "handlebar" is meant any structural member or members adapted to receive force from a user's hand or body for the purpose of altering the direction of or steering a bicycle, motorcycle or other vehicle or machine. By steerer tube is meant any structural member carrying, controlling or affixed to a wheel or other ground-contacting device and useful for affecting steering or directional control of a bicycle, motorcycle or other vehicle or machine. By helically twisted is meant twisted through an angle of approximately ninety degrees over a length, along a longitudinal axis; the stem clamp of the present invention twists helically along its length from a substantially vertical clamp portion to a substantially horizontal clamp portion.

Having described preferred embodiments of a new and improved stem clamp, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A bicycle stem clamp for carrying a bicycle handlebar and providing a releasable connection to a steerer tube, comprising:

a first helically twisted clamping member having a first end opposite a second end and separated therefrom by a selected length, said first end being disposed parallel to a first member first plane and having a first substantially semi-cylindrical groove therein with an axis parallel to said first member first plane, said second end being disposed parallel to a first member second plane disposed substantially perpendicularly to said first member first plane and having a second substantially semi-cylindrical groove therein with an axis parallel to said first member second plane;

a second helically twisted clamping member having a first end opposite a second end and separated therefrom by said selected length, said first end being disposed parallel to a second member first plane and having a first substantially semi-cylindrical groove therein with an axis parallel to said second member first plane, said second end being disposed parallel to a second member second plane disposed substantially perpendicularly to said second member first plane and having a second substantially semi-cylindrical groove therein with an axis parallel to said second member second plane;

wherein said first and second helically twisted clamping members are juxtaposed with said first helically twisted clamping member first end abutting said second helically twisted clamping member first end and with said first helically twisted clamping member second end abutting said second helically twisted clamping member second end, to make said first member first plane and said second member first plane substantially coplanar while said first member second plane and said second member second plane are substantially coplanar; and said substantially semi-cylindrical grooves being aligned to define first and second cylindrical apertures therethrough, said first aperture being transverse to said second aperture and being sized to receive the handlebar and said second aperture being sized to receive the steerer tube.

2. The bicycle stem clamp of claim 1, wherein said first and second helically twisted clamping members are fastened to one another with threaded fasteners.

3. The bicycle stem clamp of claim 1, wherein at least one of said first and second helically twisted clamping members are made of metal.

4. The bicycle stem clamp of claim 3, wherein at least one of said first and second helically twisted clamping members are made of aluminum.

5. The bicycle stem clamp of claim 3, wherein at least one of said first and second helically twisted clamping members are made of steel.

6. The bicycle stem clamp of claim 4, wherein at least one of said first and second helically twisted clamping members are made of titanium.

7. The bicycle stem clamp of claim 4, wherein said first and second helically twisted clamping members, when assembled, define a hollow interior.

8. The bicycle stem clamp of claim 1, wherein at least one of said first and second helically twisted clamping members are made of plastic.

9. The bicycle stem clamp of claim 8, wherein at least one of said first and second helically twisted clamping members are made of thermoplastic.

10. A helically twisted clamping member having an elongate body disposed along a longitudinal axis, a first end having a substantially planar surface in a first plane intersecting said longitudinal axis and a second end disposed in a second plane intersecting said longitudinal axis and substantially perpendicular to said first plane;

said clamping member having a first grooved clamping surface proximate said first end and having a first transverse axis parallel to said first plane; and said clamping member having a second grooved clamping surface proximate said second end and having a second transverse axis parallel to said second plane.

11. The helically twisted clamping member of claim 10, wherein said elongate body includes a plurality of apertures adapted to receive threaded fasteners.

12. The helically twisted clamping member of claim 10, wherein said elongate body is made of metal.

13. The helically twisted clamping member of claim 12, wherein said elongate body is made of aluminum.

14. The helically twisted clamping member of claim 12, wherein said elongate body is made of steel.

15. The helically twisted clamping member of claim 12, wherein said elongate body is made of titanium.

16. The helically twisted clamping member of claim 10, wherein said elongate body is made of plastic.

17. The helically twisted clamping member of claimed 16, further including a semi-cylindrical metal reinforcement disposed within and carried by at least one of said first grooved clamping surface and said second grooved clamping surface.

18. The helically twisted clamping member of claim 10:

said clamping member including a helically twisted scoop bounded by helically twisted ribs; said scoop and said ribs being helically twisted about the longitudinal axis of the clamping member.

* * * * *